United States Patent [19]
Scheiter

[11] 3,739,658
[45] June 19, 1973

[54] TRANSMISSION
[75] Inventor: Milton H. Scheiter, Bloomfield Hills, Mich.
[73] Assignee: General Motors Corporation, Detroit, Mich.
[22] Filed: June 7, 1971
[21] Appl. No.: 150,515

[52] U.S. Cl. .................. 74/730, 74/691, 74/200
[51] Int. Cl. ... F16h 47/00, F16h 37/06, F16h 15/08
[58] Field of Search ................. 74/730, 200, 691

[56] References Cited
UNITED STATES PATENTS

| | | | |
|---|---|---|---|
| 1,833,475 | 11/1931 | Standish | 74/690 |
| 3,106,100 | 10/1963 | Tomaszek et al. | 74/690 X |
| 3,244,025 | 4/1966 | Francisco | 74/690 |
| 3,394,617 | 7/1968 | Dickenbrock | 74/730 |
| 3,406,597 | 10/1968 | Perry et al. | 74/691 X |
| 3,574,289 | 4/1971 | Scheiter et al. | 74/864 |

Primary Examiner—Arthur T. McKeon
Attorney—Warren E. Finken, A. M. Heiter and John P. Moran

[57] ABSTRACT

A continuously variable transmission including a prime mover driven-input shaft connected by a first transfer drive to drive two spaced toric transmission units which are connected by a second transfer drive combining the outputs from both units to drive a fluid torque converter driving the output shaft. A chain and sprocket transfer drive is connected intermediate the two toric units in one transmission for transferring the combined output from the two toric units to the fluid torque converter and output shaft on an axis parallel to that of the input shaft and toric units, and in another transmission for transferring the output of the input shaft to the two toric units whose combined output is transferred axially to the fluid torque converter such that the in-line transmission is parallel to the input shaft. Further embodiments provide for dual output shafts which may be operated together or independently of one another.

15 Claims, 4 Drawing Figures

TRANSMISSION

This invention relates to automotive transmissions and, more particularly, to friction transmissions of the "toric" roller type.

This transmission is particularly suitable for busses and trucks wherein the prime mover, such as a gas turbine engine, is coupled with a so-called "gearless", or continuously variable ratio transmission in order to provide smooth, shift-free, and substantially noiseless forward operation, with reverse operation being readily provided by a clutch and planetary gear arrangement.

Accordingly, an object of the invention is to provide an improved toric transmission which may be used with a gas turbine engine for producing the proper drive ratio under all operating conditions without any "shift feel" or noticeable change in inertia, with minimal noise characteristics, and with the input and output thereof operative along parallel axes.

Another object of the invention is to provide an improved toric transmission, wherein the output from a pair of oppositely disposed output races is averaged, with the result thereof transmitted from intermediate the output races via a chain drive arrangement to a fluid torque converter for torque multiplication prior to output along an axis parallel to the input axis.

A further object of the invention is to provide an improved toric transmission, wherein the overall arrangement is as compact as possible.

An object of one embodiment of the invention is to provide a toric transmission whose overall length is relatively short, wherein two toric roller sets are mounted on an input shaft, while a fluid torque converter and suitable clutch means are axially aligned with an output shaft whose axis is closely adjacent and parallel to the axis of the input shaft, with an interconnecting chain and sprocket drive means.

An object of a second embodiment of the invention is to provide a toric transmission whose overall width is relatively narrow, wherein the axis of the shaft for two toric roller sets and the axes of a fluid torque converter shaft and associated output shaft are aligned, with the toric roller shaft being driven by chain and sprocket means from an engine shaft extension, the transmission and engine being closely adjacent and parallel to one another.

Still another object of the invention is to provide an improved toric transmission, wherein dual, axially aligned outputs are available from a single input parallel thereto.

A still further object of the invention is to provide an improved toric transmission, wherein power take-off means are provided along with the above-described compact parallel drive arrangements.

Figure 1:
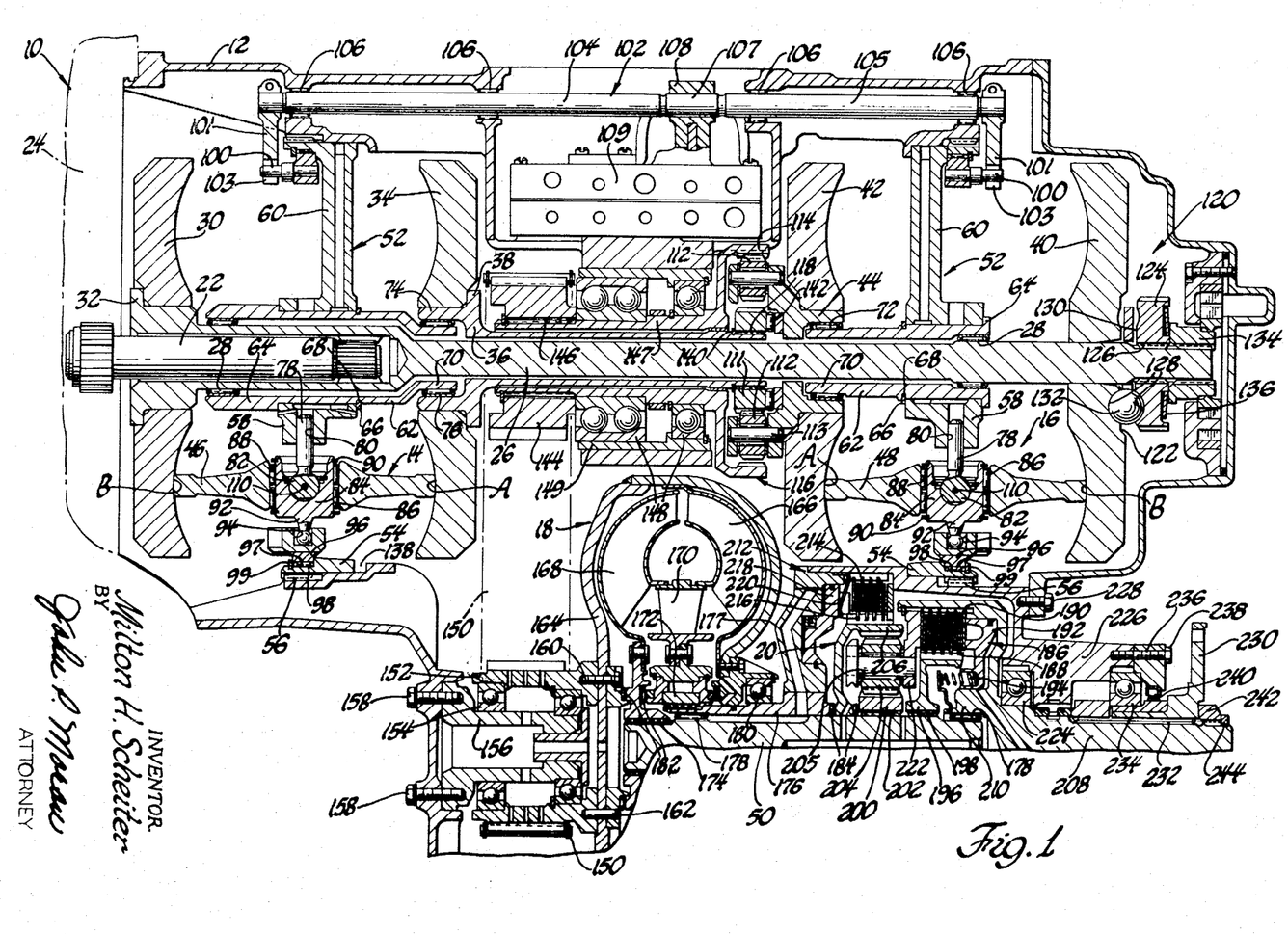
FIG. 1 is a cross-sectional view of a toric transmission embodying the invention.

These and other objects and advantages of the invention will become apparent when reference is made to the following description and accompanying drawings, wherein:

FIG. 1 Embodiment

Referring now to the drawings in greater detail, FIG. 1 illustrates a transmission 10, including a casing 12 housing dual toric sections 14 and 16, a fluid torque converter 18 and a planetary-type reverse gearing mechanism 20. A power turbine-driven transmission shaft 22 extends into the casing 12 from a prime mover, such as a gas turbine engine, represented generally at 24. A transmission input shaft 26 is splined at its left end to the shaft 22 and extends axially through the casing 12, supported on needle bearings 28.

The toric section 14 includes a first input race 30 which is secured in a suitable manner on the transmission input shaft 26 adjacent a collar 32 formed on the leftmost end thereof, and a first output race 34 which is secured in a suitable manner to an intermediate shaft 36 against a collar 38 formed adjacent the right-hand end thereof. The collar 38 is oppositely disposed from the input shaft collar 32. The toric section 16 includes a second input race 40 which is freely mounted around the right-hand end of the transmission input shaft 26, and a second output race 42 secured in a suitable manner to a carrier 44. The toric sections 14 and 16 each additionally includes two three-roller assemblies rotatably mounted between the two sets of input (30 and 40) and output (34 and 42) races, respectively. While all the rollers are identical, each roller member of the left set is hereinafter designated as 46, and each roller member of the right set as 48.

It may be noted at this point that the power flow through the system is as follows:

The prime mover, in this instance, the gas turbine engine 24, rotates the power turbine-driven transmission shaft 22. The shaft 22, in turn, rotates the transmission input shaft 26 and its associated input races 30 and 40. Rotation of the input races 30 and 40 rotates the adjacent rollers 46 and 48, respectively. The rollers 46 and 48, in turn, rotate their respective output races 34 and 42. The speed of the output races 34 and 42 is determined by the tilt position of the rollers 46 and 48, respectively. For instance, if the rollers 46 and 48 are tilted such that the input races 30 and 40 have pitch radii smaller than the pitch radii of output races 34 and 42, the resultant speed of the output races 34 and 42 is at a lower speed ratio than the 1:1 ratio illustrated, speed ratio, unless otherwise defined, being output speed/input speed. The rotary speed of the output races 34 and 42 is transmitted to the fluid torque converter 18 by suitable means. At 2.5:1 input speed/output speed, for example, for idle operation there is insufficient output from the converter 18 to an output shaft 50 connected thereto to move the vehicle on level ground. When the input-to-output speed ratio is 1:1 or less, there is a corresponding performance output through the torque converter 18. When the planetary-type reverse gearing mechanism 20 is engaged, the resultant output is in the opposite rotational direction, while the toric section remains in 1:1 speed ratio.

Considering now the toric roller sections 14 and 16 in greater detail, each set of rollers 46 and 48 is a part of an assembly which includes a spider member 52 which is secured concentrically by an outer ring 54 to the casing 12 in any suitable manner, such as splines 56. A central hub portion 58 is secured to the outer ring 54 by means of three spoke members 60, the spokes 60 being located alternately with the rollers 46 and/or 48. A cylindrical member 62 is press-fitted in the hub portion 58 and restrained from axial movement by a collar 64 formed on an end of the cylindrical member 62 and a retaining ring 66 mounted in a groove 68 formed in the outer surface of the member 62. An extension 70 is formed on the cylindrical member 62 and, in the case of the rear spider, extends into the carrier 44. The carrier 44 is rotatably mounted thereon by means of needle bearings 72. In the case of the front spider, the extension 70 extends into a counterbored end 74 of the intermediate shaft 36. The end 74 is rotatably mounted on the extension 70 by means of needle bearings 76. Bearings 28, mounted in spider member 62, support and radially locate the transmission input shaft concentrically with spider member 52 and casing 12. As a result, all race elements are also concentrically mounted. A pin or mooring mast 78 is press-fitted in each radial opening 80 formed in the central hub portion 58 and includes a ball-shaped pivot 82 which extends into the center of the rollers 46 or 48. A carrier 84 is spherically mounted on the ball-shaped pivot 82 and pilots the respective needle bearings 86 in an axial opening 88 formed in each of the rollers. Retaining rings 90, in respective grooves on the carrier 84, axially restrain the needle bearings 86 in position while permitting the rollers 46 and 48 to seek their independent locations, as dictated by the front races 30 and 34 and rear races 40 and 42. The carrier 84 includes an extension 92 which extends radially outwardly therefrom into an angular groove or slot 94 formed in ratio control collars 96. The ratio control collars 96 are rotatably mounted on antifriction or needle bearings 97 in a concentric annular space 98 formed on the inside of the outer ring 54, the collars 96 being axially located therein by means of retaining rings 99 mounted in a groove formed in the outer ring 54.

It may be realized that the slots or grooves 94 are angularly disposed at a predetermined angle on the collars 96. It may be further realized that pin members 100 are secured to the collars 96 extending in opposite outward directions therefrom. Crankarms 101 are formed on the ends of a shaft 102. Each of the crankarm members 101 includes a slot 103 formed therein into which the respective pin members 100 extend. The shaft 102 includes long and short portions 104 and 105, respectively, rotatably supported on bearings 106 in the casing 12, with an intermediate section 107. The diameters of the shaft extensions 104 and 105 are such that, when multiplied by their respective lengths, the same torsional force will be exerted on the fixed crankarm members 101. A member 108, capable of causing the rotation of the shaft 102, is operatively connected to the intermediate section 107 thereof and extends from housing 109, which houses a suitable hydraulic or other type of actuating system. Such a system is illustrated and described in U.S. Pat. application Ser. No. 822,122, now U.S. Pat. No. 3,574,289 filed May 6, 1969 in the names of Milton H. Scheiter and Frank Dickenbrock.

Accordingly, any reciprocal movement of the member 108, caused by a hydraulic signal within the housing 109, will rotate the shaft extensions 104 and 105 along with crankarm members 101. Rotation of the crankarm members 101 will act upon the pins 100, located in the slots 103, to rotate the front and rear control collars 96.

Since the slots 94 are angularly disposed on the inner surfaces of the front and rear control collars 96, it may be realized that, with the rollers 46 and 48 of the toric sections 14 and 16, respectively, in the 1:1 output speed/input speed ratio position, as shown, the initial rotation of the slots 94 will cause each extension 92 of each roller carrier 84 to incline on a plane perpendicular to the shaft 26 axis within the limits permitted by one or more pins 110 mounted in aligned openings formed in the pivot 82 and the carrier 84 and as more fully explained in U.S. Pat. No. 3,394,617 issued on July 30, 1968, in the name of Frank Dickenbrock, and in U.S. Pat. application Ser. No. 822,121, now U.S. Pat. No. 3,581,587 filed May 6, 1969 in the name of Frank Dickenbrock. The rollers 46 and 48 will likewise be initially inclined about an axis running between the areas of contact "A" and "B" formed by the roller circumference and the adjacent input and output race toroidal surfaces, respectively. The roller inclination generates forces at the points of contact, "A" and "B", with the respective input and output races, which causes the rollers 46 and 48 to tilt perpendicularly to their planes of inclination, causing the roller contacts to move in opposite radial directions along the toric surfaces formed on opposing faces of the front and rear input and output races 30 and 34, and 40 and 42, respectively, thereby changing the drive ratio. As each of the rollers 46 and 48 tilts, it pulls the carrier 84 and its associated extension 92 to move along its respective slot 94 until the previously described angle of inclination has returned to zero. For each rotary position of the ratio control collars 96, there results a corresponding tilt angle for the rollers 46 and 48.

Whether the drive ratio is increased or decreased, i.e., whether contact point "A" tilts inwardly toward the axis of the transmission input shaft 26 or radially outwardly therefrom, with point "B" tilting a corresponding distance in the opposite radial direction, depends upon whether the ratio collars 96 are rotated initially in a clockwise direction or a counterclockwise direction by the crankarm members 101. If point "A" moves radially inwardly along the input races 30 and 40, and point "B" moves radially outwardly along the output races 34 and 42. the resultant drive ratio will be increased, whereas radial outward movement of point "A" along the input races 30 and 40 will produce a decreased speed ratio between the input and output races, as explained in the above-mentioned U.S. Pat. No. 3,394,617 and U.S. Pat. application Ser. No. 822,121.

It may be noted that substantially one-half of the total input from the power turbine-driven transmission shaft 22 is transmitted via the input shaft 26 to the input race 30, while the remaining one-half of the input goes to the other input race 40. The resultant outputs from the output races 34 and 42, respectively, drive a sun gear 111 through the intermediate shaft 36, and the carrier 44 directly. The sun gear 111, two sets of pinion gears 112, a pinion shaft 113, and a ring gear 114 comprise a so-called "differential mechanism" 116. The sun gear 111 is splined at 118 to the right-hand end of the transmission intermediate shaft 36 and meshes with one set of the two meshing sets of pinion gears 112, whose shaft 113 is driven by the carrier 44 which, in turn, is driven by the output race 42. The other set of pinion gears 112 meshes with the ring gear 114.

It should be apparent that, if there were no section-to-section discrepancies, such as might result from accumulation of manufacturing tolerances, exactly half the torque would be applied to the sun gear 111 and half to the carrier 44, the total of the two halves being applied to the ring gear 114. Under these conditions, the sun, pinion and ring gears would act as a unit, without any relative rotation therebetween. However, since discrepancies between toric sections are bound to exist, the resultant speed differences will result in some relative rotation between the carrier 44 and the sun gear 111, the average being applied to the ring gear 114.

An axial loader mechanism 120 is operatively connected to the transmission input shaft 26 and the adjacent outer face 122 of the second or rear input race 40. The axial loader mechanism 120 includes a ring member 124 splined at 126 to the input shaft 26. Converging ramps 128 are formed on the opposing faces 122 and 130 of the input race 40 and the ring member 124, respectively. Three ball members 132 are located between the opposing ramps 128. The ring member 124 is held from axial movement by a nut 134 which is threadedly secured to the right-hand end of the transmission input shaft 26. A Belleville spring 136 is located between the nut 134 and the ring member 124, thus statically preloading the roller-race contact in compression and the input shaft 26 in tension. It may be realized that, when the transmission input shaft 26 is rotated, the ball members 132 will tend to move circumferentially along the converging ramps 128 on the race 40 and the member 124, thereby urging the axially movable input race 40 against the circumferential edges of the rollers 48 as a function of one-half the input torque, as mentioned above.

Inasmuch as the rear spider ring 54 is fixed to the casing 12 as explained above, the rear rollers 48 are confined by the carrier extension 92 within the walls of their respective grooves 94, the rollers 48 cannot move to the left under the above force of the input race 40. Instead, the slack in the system will be taken up by virtue of the ring member 124 being forced to the right by the ball members 132, thereby pushing the nut 134 and the associated transmission input shaft 26 to the right. The front input race 30 will, as a result, be moved to the right by the shaft collar 32, forcing the front toric roller assembly 14 to the right, as permitted by the front spider ring 54, which is free to "float" or move axially on the splines 56 with respect to the casing 12 through the space 138. The rollers 46, in turn, force the output race 34, the intermediate shaft 36, and the sun gear 111 to the right through the collars 38 and 140, respectively. The sun gear 111 will also push the carrier 44 to the right through intermediate needle bearings 142, and the carrier 44 will be forced against the circumferential edges of the rollers 48.

The differential ring gear 114 rotates a sprocket member 144 which is splined at 146 to an axial sleeve shaft extension 147 of the ring gear 114. The sleeve shaft extension 147 is rotatably and axially supported by bearings 148 within a fixed housing portion 149. The sprocket member 144, in turn, rotates a chain 150 in the plane normal to the axis of the extension 147, thereby completing a right-angle output intermediate the dual toric sections 14 and 16. The chain 150 meshes at its extended end with a second sprocket member 152 which is rotatably mounted on bearings 154 mounted around a fixed hub member 156, the latter being secured to the casing 12 by bolts 158. The sprocket member 152 is secured by bolts 160 and pins 162 to the housing 164 of the fluid torque converter 18.

The fluid torque converter 18 includes the usual pump 166, turbine 168, stator 170 and sprag clutch 172, the turbine 168 being splined at 174 to the output shaft 50. A stator and sprag clutch support shaft 176 having an end flange 177 formed thereon is supported on fore and aft needle bearings 178 mounted around the output shaft 50. Stator reaction torque is transmitted to ground through the sprag clutch 172 to the stator support shaft 176. The converter housing 164 and the pump 166 are supported radially on bearings 180. Converter thrust load is transmitted through thrust bearings 182 to the bearings 184. It may be noted at this point that while the left-hand end of the converter housing 164 is retained in position, the bearings 180 will permit the housing 164 to extend or "breathe" under the centrifugal differential pressure heads to which it will be subjected during operation.

Inasmuch as the roller assemblies 14 and 16 are unidirectional and, hence, satisfactory for forward movement only, the planetary-type reverse gearing mechanism 20 is utilized to accomplish a reverse vehicular operation. During forward operation, a clutch 186, including discs or plates 188 and 190, a piston 192, and return springs 194, mounted on a clutch hub 196 splined at 198 to the output shaft 50, is hydraulically engaged, causing the sun gear 200, splined at 202 to the output shaft 50, two meshing sets of pinions 204 on respective pinion shafts 205, and ring gear 206 of the unit 20 to move as a unit, serving as a direct drive connection between the output shaft 50 and a final output shaft 208 via an output drum 210. One set of pinions 204 meshes with the sun gear 200, while the other set meshes with the ring gear 206 in the conventional manner.

For reverse operation, the forward clutch 186 is disengaged, and a reverse brake 212, including discs 214 and 216, a piston 218 and a return spring 220, is hydraulically engaged. As a result, the ring gear 206 will serve as a reaction member, the sun gear 200 will be rotated in one direction by the transmission output shaft 50, causing the pinion gears 204, the carrier 222 and the output drum 210 to reverse, the latter rotatably supported and axially positioned on bearings 224 mounted adjacent a support member 226 secured to the output end of the casing 12 by bolts 228. An output flange member 230 is splined at 232 to the output shaft 208 and rotatably supported on bearings 234 within the support member 226. The bearings 234 are retained axially by a ring member 236 secured to the support member 226 by bolts 238. A seal 240 prevents leakage therepast. The output flange member 230 is retained axially by a nut 242 and a retaining ring 244 mounted on the output shaft 208.

Figure 2:
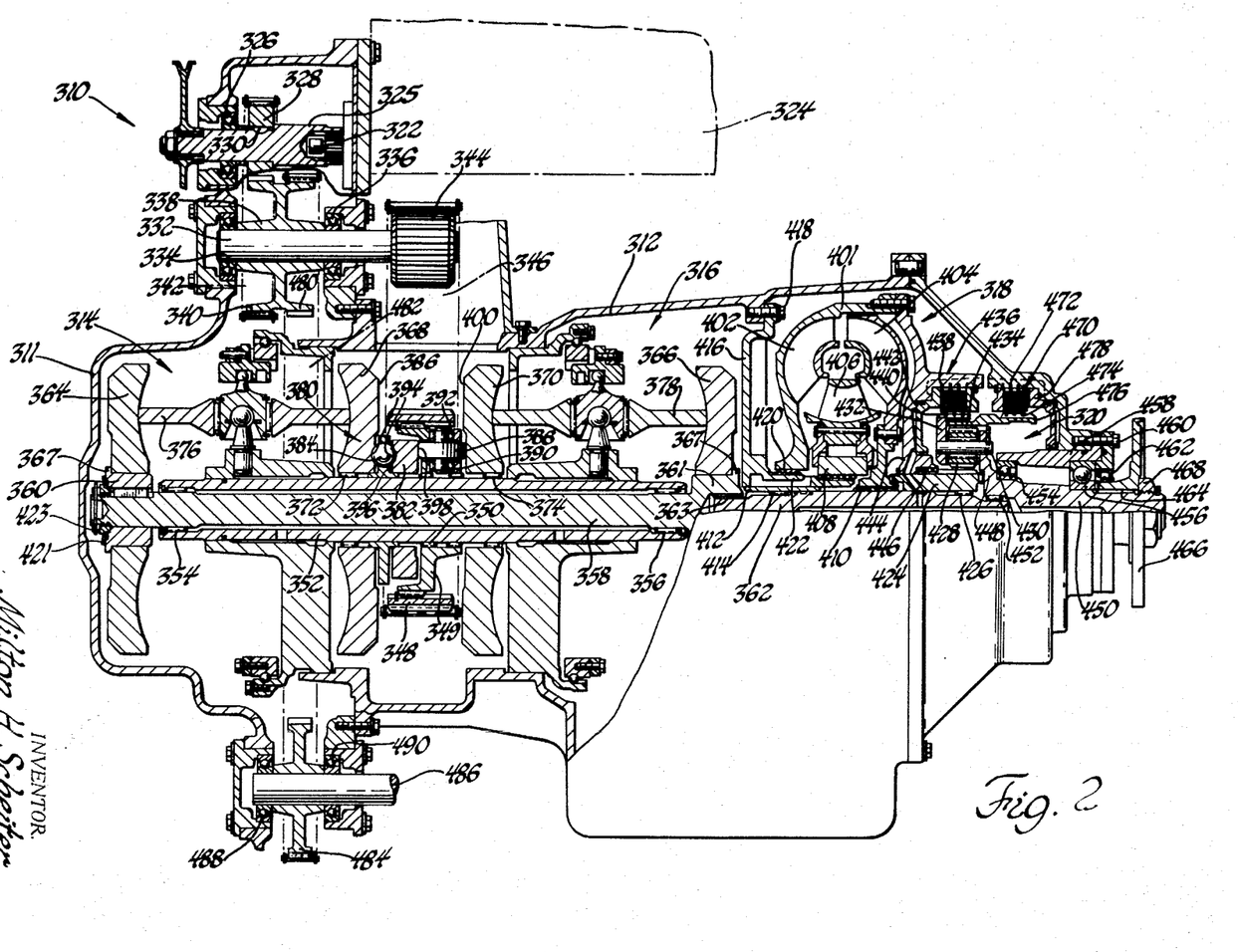
FIGS. 2 and 3 are cross-sectional views of alternate embodiments of the invention.

FIG. 2 Embodiment

FIG. 2 illustrates a transmission 310 whose housing includes respective front and rear casings 311 and 312, the latter housing dual toric sections 314 and 316, a fluid torque converter 318 and a planetary-type reverse gearing mechanism 320. A power turbine-driven shaft 322 extends into the front casing 311 from a prime mover, such as a gas turbine engine represented generally at 324. An extension shaft 325 is splined at its right end to the turbine shaft 322 and extends through the front casing 311, rotatably mounted on bearings 326. A sprocket 328 is secured to the turbine shaft 322 by any convenient means, such as a key 330.

A second shaft 332, positioned parallel to the shaft 325, is rotatably supported in the front casing 311 on bearings 334 and 336. A second sprocket 338 is secured to the parallel shaft 332 in any suitable manner, such as pressfitting, intermediate the bearings 334 and 336. A left-hand portion 340 of the second sprocket 338 is radially aligned with the sprocket 328. A chain 342 is mounted around the sprocket 328 and the left-hand portion 340 of the sprocket 338 to drive the shaft 332 along with the extension shaft 325.

A third sprocket 344 is formed on the rightwardly extending end of the shaft 332. A second chain 346 is mounted around the sprocket 344 to drive a fourth sprocket 348 which is splined to a hub member 349, the latter being rotatably mounted by bearings 350 on a sleeve shaft 352. The sleeve shaft 352 is rotatably mounted on bearings 354 and 356 around a central shaft 358. Flange members 360 and 361 are formed on opposite ends of the central shaft 358, and a transfer shaft 362 is splined at 363 to the flange 361 end of the central shaft 358.

A pair of oppositely disposed output races 364 and 366 of the respective toric sections 314 and 316 are secured to the respective flange members 360 and 361, abutting against shoulders 367 formed thereon. The two toric sections 314 and 316 each further include an input race 368 and 370, respectively, rotatably mounted by respective bearings 372 and 374 on the sleeve shaft 352 on opposite sides of the sprocket 348 and the hub member 349. Two 3-roller assemblies are rotatably mounted between the two sets of input and output races (368/364 and 370/366), respectively. While all of the rollers are identical, each roller member of the toric section set 314 is hereinafter designated as 376, and each roller member of the toric section set 316 as 378. The ratio control roller tilting arrangement for the rollers 376 and 378 is generally similar to that described above relative to the rollers 46 and 48 of FIG. 1 and, hence, will not be discussed here.

An axial loader and differential mechanism 380, including a ring member 382 and a plurality of ball members 384, is located around the sleeve shaft 352 adjacent the outer face 386 of the input race 368 and adjacent rollers 388 mounted on respective shafts 390 and rotatably supported in the hub member 349 on needle bearings 392. Converging ramps 394 are formed on the respective opposing faces 386 and 396 of the input race 368 and the ring member 382. The rollers 388 frictionally contact the other face 398 of the ring member 382 and the outer face 400 of the other input race 370.

The fluid torque converter 318 includes a housing 401, a pump 402, a turbine 404, a stator 406, and a sprag clutch 408, the turbine 404 being splined at 410 to the transfer shaft 362. A support sleeve 412, mounted on bearings 414 around the output shaft 362, supports the stator 406 and the sprag clutch 408. Stator reaction to torque is transmitted to ground through the sprag clutch 408 and the support sleeve 412 to a fixed wall member 416 secured to the rear casing 312 by bolts 418. The converter housing 401 is mounted on bearings 420 around a collar 422 formed on the wall member 416.

It may be noted at this point that the power flow through the system is as follows: The prime mover, e.g., the gas turbine engine 324, rotates the power turbine-driven shaft 322 and the extended shaft 325. The shaft 325, in turn, rotates the sprocket 328 which, via the chain 342, rotates the sprocket 338 and the associated parallel shaft 332. Rotation of the adjacent parallel shaft 332 rotates the sprocket 344 which, via the chain 346, rotates the sprocket 348 mounted around the sleeve shaft 352. Due to adjustable preload provided by a Belleville spring 421 and a nut 423 located on the central shaft 358, the ball members 384 will tend to move circumferentially along the converging ramps 394 on the input race 368 and the ring member 382, thereby urging the axially movable input race 368 against the circumferential edges of the rollers 376, and also urging the rollers 388 against the other input race 370 to, in turn, urge the latter against the edges of the rollers 378, and provides planetary differential action between toric sections.

Rotation of the input races 368 and 370 rotates the adjacent rollers 376 and 378, respectively. The rollers 376 and 378, in turn, rotate the respective output races 364 and 366. As in the FIG. 1 structure, the speed of the output races 364 and 366 is determined by the tilt position of the respective rollers 376 and 378 in the conventional manner. The rotary speed of the output races 364 and 366 is transmitted via the respective end flanges 360 and 361, the central shaft 358 and the transfer shaft 362 to the fluid torque converter 318 for torque multiplication purposes prior to output therefrom.

Inasmuch as the roller assemblies 314 and 316 are unidirectional and hence satisfactory for forward movement only, the planetary-type reverse gearing mechanism 320 is utilized to accomplish a reverse vehicular operation. The reverse gearing mechanism 320 includes a sun gear 424 rotatably supported on bearings 426 on the transfer shaft 362, two sets of pinion gears 428 mounted on respective pinion shafts 430 supported in a carrier member 432, and an outer ring gear 434. A forward clutch 436 includes discs or plates 438 splined to the converter housing 401, discs or plates 440 splined to the carrier 432, and a piston 442 mounted on a clutch hub member 444 splined at 446 to the sun gear 424. The carrier 432 is connected by a flange member 448 to an output shaft 450, the latter being rotatably mounted on needle bearings 452 on the right end of the transfer shaft 362 and supported by bearings 454 and 456 mounted in a sleeve member 458 secured to the rear casing 312 by bolts 460. Suitable seals 462 between the sleeve member 458 and a hub 464 of an output flange 466 prevent leakage therepast. A nut 468 retains the output flange 466 on the output shaft 450.

A reverse brake 470 includes discs or plates 472 splined to the rear casing 312, discs or plates 474 splined to an extension sleeve 476 formed on the outer ring gear 434, and a piston 478 mounted around the fixed output sleeve member 458.

For forward operation, the forward clutch 436 is hydraulically engaged, causing the sun gear 424 and the carrier member 432, and thus the outer ring gear 434, to rotate as a unit, serving as the direct drive connection between the converter housing 401 and the output shaft 450.

For reverse operation, the forward clutch 436 is disengaged and the reverse brake 470 is hydraulically engaged. As a result, the ring gear 434, via the extension sleeve 476, will serve as a reaction member. The sun gear 424 will be rotated in one direction by the converter housing 401, causing the pinion gears 428, the carrier member 432, the flange member 448 to rotate in the reverse direction, thus rotating the output shaft 450 in reverse.

Referring now to the second-mentioned sprocket 338 (upper left-hand portion of FIG. 2), it may be noted that the right-hand portion 480 thereof serves as a means for rotating a chain 482 which is mounted around an additional sprocket 484 secured to an accessory drive shaft 486 rotatably mounted in bearings 488 and 490 in the front casing 311. The accessory drive chain 482 may be used to drive many drive shafts, such as the shaft 486, to drive respective accessory mechanisms (not shown) in proportion to the speed of the gas turbine engine 324.

Figures 3, 4:
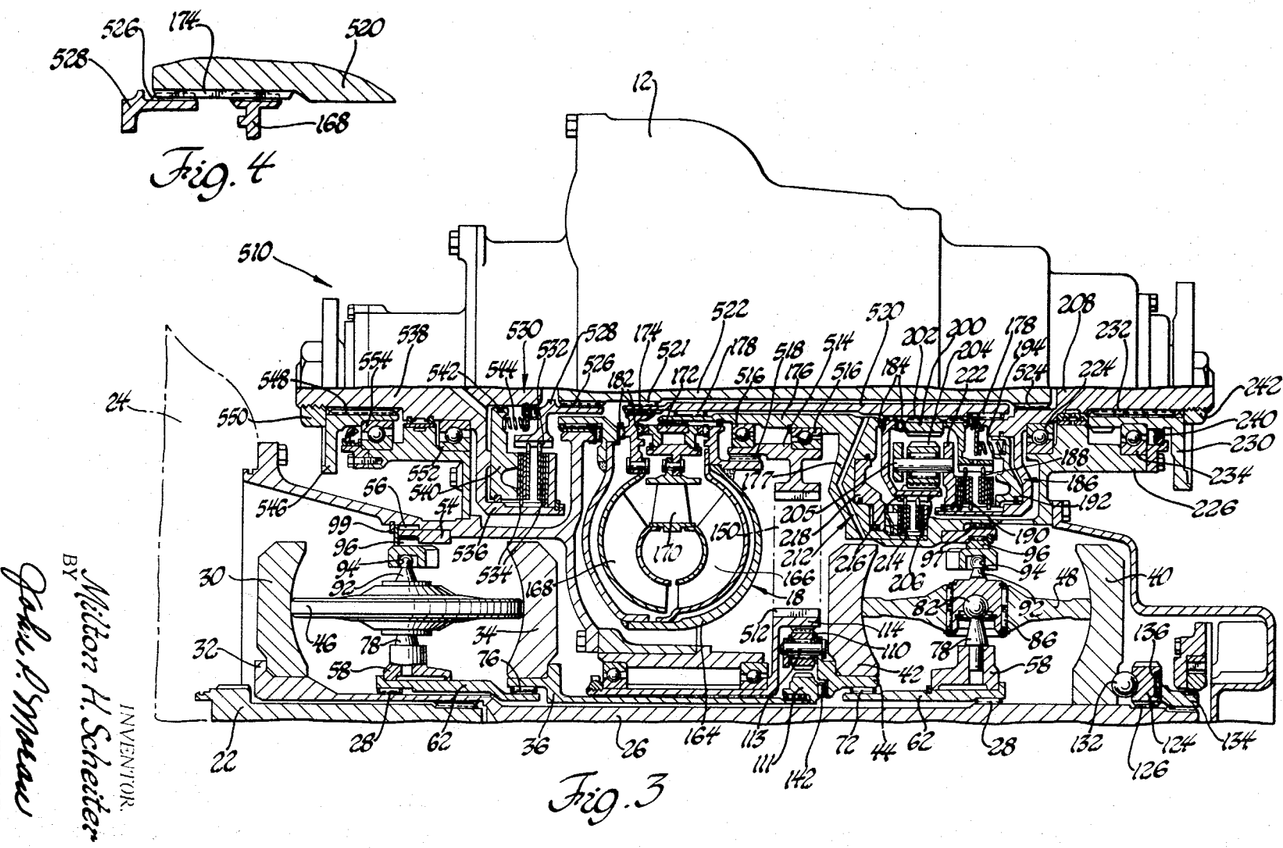
FIG. 4 is a fragmentary cross-sectional view illustrating an alternate embodiment of a portion of FIG. 3.

FIG. 3 Embodiment

This embodiment, identified as 510, is generally similar in structure and mode of operation to the FIG. 1 embodiment, and all similar components of FIG. 3 will bear the same reference numerals as those of FIG. 1. The FIG. 3 structure differs from FIG. 1 in that it includes the additional feature of a dual, axially aligned output shaft arrangement, providing for front wheel drive or a power take-off for driving accessories. Power generation to the fluid torque converter 18 and thence to the first output shaft 208 is similar to that of FIG. 1, except that the sprocket teeth 512 are formed on the outer periphery of the differential output ring gear 114, and the chain 150 is mounted thereon and thence around a sprocket 514 generally similar to the sprocket 152 of FIG. 1. The sprocket 514 is rotatably mounted on bearings 516 around the stator support shaft 176 and splined at 518 to the converter housing 164.

While actuation of the first output shaft 208, via either the forward brake 186 or the reverse clutch 212, downstream of the fluid torque converter 18, is as described above relative to FIG. 1, a sleeve shaft 520 is employed in lieu of the substantially solid shaft 50 of FIG. 1. Such a sleeve shaft 520 accommodates the extension therethrough on bearings 521 of a central shaft 522 which, for a front wheel drive application, for example, may be connected at one end thereof by splines 524 to the output shaft 208. Splines 526 are formed on the central shaft 522 and on a hub member 528 of a clutch 530 to interconnect these members.

The clutch 530 includes discs or plates 532 slidably secured to the hub member 528 for rotation therewith, and alternately located discs or plates 534 slidably secured to a drum 536, the latter being formed on the second output shaft 538. A piston 540 is slidably mounted within the drum 536 adjacent the discs 532 and 534, sealed by an O-ring seal 542. A return spring 544 is mounted between the piston 540 and the hub member 528.

An output flange 546 is secured by splines 548 to the output shaft 538 by a nut 550, and both are rotatably mounted in an opening formed in the casing 12 by bearings 552 and 554.

Hence, it may be noted that with the clutch 530 engaged, the second output shaft 538 will rotate with the central shaft 522 which, in turn, by virtue of the splines 524, will rotate with the first output shaft 208.

As indicated, if desired, the second output shaft 538 could be used as a power take-off means for driving various vehicular accessories. When such is the case, the transmission 510 structure would not include a central shaft 522 or splines 524, and the shaft 520 would be extended to the left (FIG. 4) such that the spline 174 is extended to mesh with the spline 526 formed on the clutch hub 528. Thus, the second output shaft 538 can be operated at the discretion of the operator via the clutch 530 independently of the operation of the first output shaft 208.

It should be apparent that the invention provides an improved compact toric transmission which utilizes chains and sprockets to transfer the averaged output results from two toric roller sets to a fluid torque converter whose output is used to rotate a parallel-positioned output shaft in either a forward or reverse direction, as directed by suitable clutch and planetary gear arrangements. The arrangement also permits the engine to be driven at high speed during vehicle idle conditions in order to drive any large accessory loads on the power turbine side of the engine in an efficient manner without having to declutch the vehicle and with substantially no effect beyond the toric units. With regard to the FIG. 2 structure, it should be apparent that other sprockets (not shown) may be mounted on the plane of the chain 482 and sprockets 480 and 484 and driven by the chain 482 for driving additional vehicular accessories.

While several embodiments of the invention have been shown and described, other modifications thereof are possible.

I claim:

1. A toric transmission comprising a housing, a transmission input member rotatably mounted in said housing, a transmission output member rotatably mounted in said housing and positioned parallel to said transmission input member, a pair of input races, first drive-connecting means operatively connecting said transmission input member to said pair of input races, an output race opposing each of said pair of input races, a set of rollers frictionally rotatable and tiltable between each set of input and output races for permitting continuously variable output/input speed ratios, a fluid torque converter including an input member, a second drive-connecting means operatively connecting said output races to said torque converter input member for drive-connecting the rotary output from said output races to said torque converter input member, one of said drive-connecting means being chain drive means differentially connected to one of each of said pairs of races to equalize the load on said one of each of said pairs of races and operatively connected between said input member and said fluid torque converter input member, said output member being driven by the output from said fluid torque converter, clutch means operatively connected between said fluid torque converter and said output member for connecting said output member to said fluid torque converter for forward operation when said clutch means is engaged, and brake means and cooperating planetary gearing operatively connected between said fluid torque converter and said output member for connecting said output member to said fluid torque converter for reverse operation when said brake means is engaged.

2. A toric transmission for use with a prime mover, said transmission comprising a housing, input shaft means extending into said housing from said prime mover, output shaft means positioned parallel to said input shaft means, a pair of input races operatively connected to said input shaft means, an output race opposing each of said pair of input races, a set of rollers frictionally rotatable and tiltable between each set of input and output races for permitting continuously variable output/input speed ratios, a fluid torque converter including input means for receiving the rotary output from said output races, chain drive means operatively connected between said input shaft means and said fluid torque converter input means, said output shaft means being driven by the output from said fluid torque converter, clutch means operatively connected between said fluid torque converter and said output shaft means for connecting said output shaft means to said fluid torque converter for forward operation when said clutch means is engaged, and brake means and cooperating planetary gearing operatively connected between said fluid torque converter and said output shaft means for connecting said output shaft means to said fluid torque converter for reverse operation when said brake means is engaged.

3. A toric transmission for use with a prime mover, said transmission comprising a housing, input shaft means extending into said housing from said prime mover, output shaft means positioned parallel to said input shaft means, a pair of toric roller sections, each including an input race operatively connected to said input shaft means, an output race opposing each input race, and a set of rollers frictionally rotatable and tiltable between said input and output races for permitting continuously variable output/input speed ratios, differential means operatively connected to said toric roller sections for averaging speed differences between toric sections, a fluid torque converter including input means for receiving the rotary output from said output races, chain drive means operatively connected between said input shaft means and said fluid torque converter input means, said output shaft means being driven by the output from said fluid torque converter, clutch means operatively connected between said fluid torque converter and said output shaft means for connecting said output shaft means to said fluid torque converter for forward operation when said clutch means is engaged, and brake means and cooperating planetary gearing operatively connected between said fluid torque converter and said output shaft means for connecting said output shaft means to said fluid torque converter for reverse operation when said brake means is engaged.

4. A toric transmission for use with a prime mover, said transmission comprising a housing, input shaft means extending into said housing from said prime mover, a pair of input races secured to said input shaft means, an output race opposing each of said pair of input races, a set of rollers frictionally rotatable and tiltable between each set of input and output races for permitting continuously variable output/input speed ratios, output means operatively connected to said output races, a fluid torque converter for receiving the rotary output from said output races for torque multiplication thereof, chain drive means for transferring said rotary output from said output means to said fluid torque converter, an output shaft for receiving the output from said fluid torque converter, clutch means operatively connected between said fluid torque converter and said output shaft for connecting said output shaft to said fluid torque converter for forward operation when said clutch means is engaged, and brake means and cooperating planetary gearing operatively connected between said fluid torque converter and said output shaft for connecting said output shaft to said fluid torque converter for reverse operation when said brake means is engaged.

5. A toric transmission comprising a housing, a transmission input member rotatably mounted in said housing, at least one transmission output member rotatably mounted in said housing and positioned parallel to said transmission input member, a pair of input races, first drive-connecting means operatively connecting said transmission input member to said pair of input races, an output race opposing each of said pair of input races, a set of rollers frictionally rotatable and tiltable between each set of input and output races for permitting continuously variable output/input speed ratios, a fluid torque converter including an input member, a second drive-connecting means operatively connecting said output races to said torque converter input member for drive-connecting the rotary output from said output races to said torque converter input member, said second drive-connecting means being chain drive means differentially connected between said input member and said pair of output races to equalize the load on said pair of output races and operatively connected between said input shaft means and said fluid torque converter input member, said at least one transmission output member being driven by the output from said fluid torque converter, clutch means operatively connected between said fluid torque converter and said one transmission output member for connecting said one transmission output member to said fluid torque converter for forward operation when said clutch means is engaged, and brake means and cooperating planetary gearing operatively connected between said fluid torque converter and said one transmission output member for connecting said one transmission output member to said fluid torque converter for reverse operation when said brake means is engaged.

6. A toric transmission for use with a prime mover, said transmission comprising a housing, input shaft means extending into said housing from said prime mover, a pair of input races secured to said input shaft means, an output race opposing each of said pair of input races, a set of rollers frictionally rotatable and tiltable between each set of input and output races for permitting continuously variable output/input speed ratios, output shaft means operatively connected to said output races, differential means operatively connected to said output shaft means for averaging speed differences between said respective sets of races and rollers as received from said output shaft means, a fluid torque converter for receiving the rotary output from said differential means for torque multiplication thereof, chain drive means operatively connected to said differential means for transferring said rotary output from said differential means to said fluid torque converter, an output shaft for receiving the output from said fluid torque converter, clutch means operatively connected between said fluid torque converter and said output shaft means for connecting said output shaft means to said fluid torque converter for forward operation when said clutch means is engaged, and brake means and cooperating planetary gearing operatively connected between said fluid torque converter and said output shaft means for connecting said output shaft means to said fluid torque converter for reverse operation when said brake means is engaged.

7. The toric transmission described in claim 6, and axial loader means operatively connected to one of said races and to one of said input shaft and output shaft means for maintaining said rollers in frictional contact with said races.

8. The toric transmission described in claim 6, wherein said differential means and said output shaft means include a sun gear operatively connected to one of said output races, a carrier operatively connected to the other of said output races, a plurality of pinion gears rotatably connected to said sun gear and to said carrier, and a ring gear rotatably connected to said pinion gears.

9. A toric transmission for use with a prime mover, said transmission comprising a housing, input shaft means extending into said housing from said prime mover, a pair of input races secured to said input shaft means, an output race opposing each of said pair of input races, a set of rollers frictionally rotatable and tiltable between each set of input and output races for permitting continuously variable output/input speed ratios, axial loader means operatively connected to one of said races and to said input shaft means for maintaining said rollers in frictional contact with said races, output sleeve shaft means operatively connected to said output races and rotatably mounted around said input shaft means, a fluid torque converter for receiving the rotary output from said output sleeve shaft means for torque multiplication thereof, a first sprocket operatively connected to said fluid torque converter, a second sprocket secured to said output sleeve shaft means, a chain mounted around said first and second sprockets for transferring said rotary output from said output sleeve shaft means to said first sprocket for transfer to said fluid torque converter, a final output shaft for receiving the output from said converter, clutch means operatively connected between said fluid torque converter and said final output shaft for connecting said final output shaft to said converter for forward operation when said clutch means is engaged, and brake means and cooperating planetary gearing operatively connected between said fluid torque converter and said final output shaft for connecting said final output shaft to said converter for reverse operation when said brake means is engaged.

10. A toric transmission for use with a prime mover, said transmission comprising a housing, input shaft means extending into said housing from said prime mover, second shaft means adjacent said input shaft means, a pair of input races secured to said second shaft means, an output race opposing each of said pair of input races, a set of rollers frictionally rotatable and tiltable between each set of input and output races for permitting continuously variable output/input speed ratios, chain drive means for transferring the rotary output from said input shaft means to said second shaft means, output means operatively connected to said output races, a fluid torque converter for receiving the rotary output from said output races for torque multiplication thereof, transfer means for transferring said rotary output from said output means to said fluid torque converter, an output shaft for receiving the output from said fluid torque converter, clutch means operatively connected between said fluid torque converter and said output shaft for connecting said output shaft to said fluid torque converter for forward operation when said clutch means is engaged, and brake means and cooperating planetary gearing operatively connected between said fluid torque converter and said output shaft for connecting said output shaft to said fluid torque converter for reverse operation when said brake means is engaged.

11. A toric transmission comprising a housing, a transmission input member rotatably mounted in said housing, a transmission output member rotatably mounted in said housing and positioned parallel to said transmission input member, a pair of input races, first drive-connecting means operatively connecting said transmission input member to said pair of input races, an output race opposing each of said pair of input races, a set of rollers frictionally rotatable and tiltable between each set of input and output races for permitting continuously variable output/input speed ratios, a fluid torque converter including an input member, a second drive-connecting means operatively connecting said output races to said torque converter input member for drive-connecting the rotary output from said output races to said torque converter input member, said first drive-connecting means being chain drive means differentially connected between said transmission input member and said pair of input races to equalize the load on said pair of input races and operatively connected between said transmission input member and said fluid torque converter input member, said transmission output member being driven by the output from said fluid torque converter, clutch means operatively connected between said fluid torque converter and said transmission output member for connecting said transmission output member to said fluid torque converter for forward operation when said clutch means is engaged, and brake means and cooperating planetary gearing operatively connected between said fluid torque converter and said transmission output member for connecting said transmission output member to said fluid torque converter for reverse operation when said brake means is engaged.

12. A toric transmission for use with a prime mover, said transmission comprising a housing, input shaft means extending into said housing from said prime mover, a first sprocket secured to said input shaft means, second shaft means located parallel to said input shaft means, a pair of input races secured for rotation with said second shaft means, an output race opposing each of said pair of input races, a set of rollers frictionally rotatable and tiltable between each set of input and output races for permitting continuously variable output/input speed ratios, axial loader means operatively connected to one of said input races and to said second shaft means for maintaining said roller in frictional contact with said races, a second sprocket secured to said second shaft means intermediate said input races, a chain mounted around said first and second sprockets, third shaft means axially aligned with and secured for rotation with said second shaft means, a fluid torque converter operatively connected to said third shaft means, a final output shaft for receiving the output from said fluid torque converter, clutch means operatively connected between said fluid torque converter and said final output shaft for connecting said final output shaft to said fluid torque converter for forward operation when said clutch means is engaged, and brake means and cooperating planetary gearing operatively connected between said fluid torque converter and said final output shaft for connecting said final output shaft to said converter for reverse operation when said brake means is engaged.

13. The toric transmission described in claim 12, and at least one additional sprocket and chain arrangement operatively connected to said input shaft means for driving at least one vehicular accessory.

14. A toric transmission for use with a prime mover, said transmission comprising a housing, input shaft means extending into said housing from said prime mover, a pair of input races secured to said input shaft means, an output race opposing each of said pair of input races, a set of rollers frictionally rotatable and tiltable between each set of input and output races for permitting continuously variable output/input speed ratios, axial loader means operatively connected to one of said races and to said input shaft means for maintaining said rollers in frictional contact with said races, output sleeve shaft means operatively connected to said output races and rotatably mounted around said input shaft means, a fluid torque converter for receiving the rotary output from said output sleeve shaft means for torque multiplication thereof, a first sprocket operatively connected to said fluid torque converter, a second sprocket secured to said output sleeve shaft means, a chain mounted around said first and second sprockets for transferring said rotary output from said output sleeve shaft means to said first sprocket for transfer to said fluid torque converter, a pair of final output shafts for receiving the output from said converter, first clutch means operatively connected between said fluid torque converter and one of said pair of final output shafts for connecting said one of said final output shafts to said converter for forward operation when said first clutch means is engaged, brake means and cooperating planetary gearing operatively connected between said fluid torque converter and one of said pair of final output shafts for connecting said one of said pair of final output shafts to said converter for reverse operation when said brake means is engaged, and second clutch means operatively connected between said pair of final output shafts for connecting said other of said final output shafts to said one of said final output shafts when said second clutch means is engaged.

15. A toric transmission for use with a prime mover, said transmission comprising a housing, input shaft means extending into said housing from said prime mover, a pair of input races secured to said input shaft means, an output race opposing each of said pair of input races, a set of rollers frictionally rotatable and tiltable between each set of input and output races for permitting continuously variable output/input speed ratios, axial loader means operatively connected to one of said races and to said input shaft means for maintaining said rollers in frictional contact with said races, output sleeve shaft means operatively connected to said output races and rotatably mounted around said input shaft means, a fluid torque converter for receiving the rotary output from said output sleeve shaft means for torque multiplication thereof, a first sprocket operatively connected to said fluid torque converter, a second sprocket secured to said output sleeve shaft means, a chain mounted around said first and second sprockets for transferring said rotary output from said output sleeve shaft means to said first sprocket for transfer to said fluid torque converter, a pair of final output shafts for receiving the output from said fluid torque converter, first clutch means operatively connected between said fluid torque converter and one of said pair of final output shafts for connecting said one of said pair of final output shafts to said converter for forward operation when said first clutch means is engaged, brake means and cooperating planetary gearing operatively connected between said fluid torque converter and one of said pair of final output shafts for connecting said one of said pair of final output shafts to said converter for reverse operation when said brake means is engaged, and second clutch means operatively connected between said converter and the other of said pair of final output shafts for connecting said other of said final output shafts to said converter independent of said one of said final output shafts when said second clutch means is engaged.

* * * * *